Nov. 2, 1965   J. N. CRAVER, JR   3,215,578
THERMOPLASTIC COATED MATERIALS AND THE METHOD OF AND
APPARATUS FOR FORMING THE SAME
Filed Aug. 15, 1960
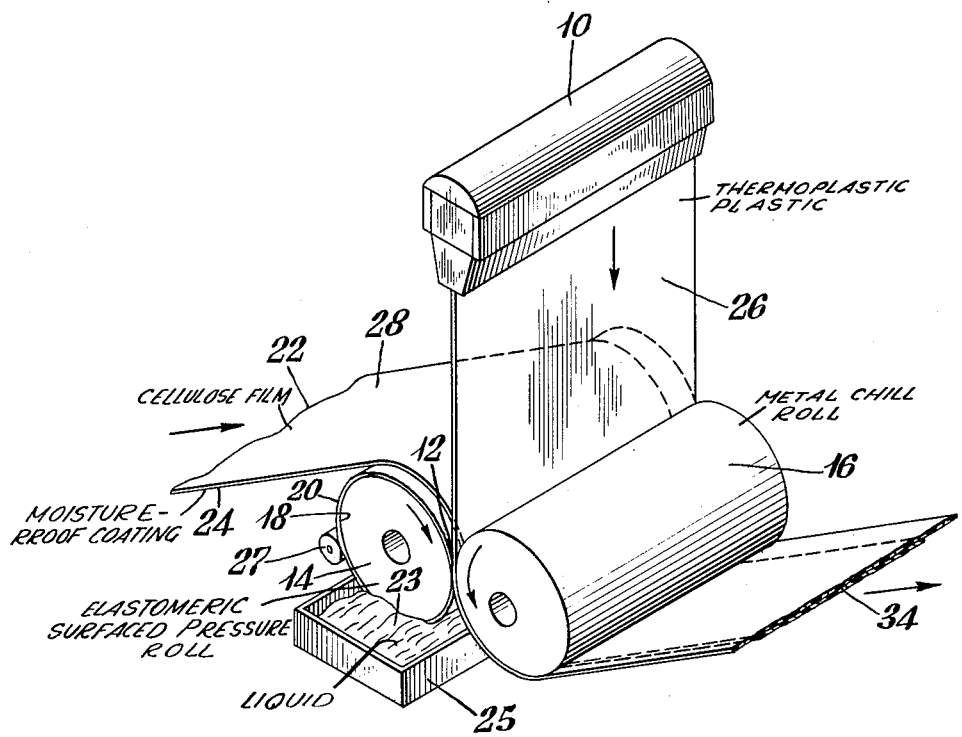
INVENTOR.
JOSEPH N. CRAVER, JR.
BY
ATTORNEY United States Patent Office 3,215,578
Patented Nov. 2, 1965

3,215,578
THERMOPLASTIC COATED MATERIALS AND THE METHOD OF AND APPARATUS FOR FORMING THE SAME
Joseph N. Craver, Jr., Park Forest, Ill., assignor to Union Carbide Corporation, a corporation of New York
Filed Aug. 15, 1960, Ser. No. 49,671
4 Claims. (Cl. 156—244)

This invention relates to a method of and apparatus for forming optically clear thermoplastic coated materials.

More particularly, this invention relates to extrusion coating a thermoplastic film onto a surface of a regenerated cellulose film having a moisture-proof wax coating on its other surface.

In the extrusion coating process, a thermoplastic coating, such as polyethylene, is melt-extruded downwardly from a slot-type die in film form. The die is ordinarily positioned above and in alignment with laminating means. In general, such means include a pair of counter-rotating rolls; one being a rubber pressure roll and the other being a chilled metal roll. The regenerated cellulose film having a moisture-proof coating on one surface thereof is fed from an external source over the rubber roll with the moisture-proof coating in direct contact with said roll. At the nip of the rolls, the molten polyethylene film is applied to the uncoated surface of the regenerated cellulose film. Here the bond or adhesion between the two films is produced. The resultant laminate is then fed around an arc of the chilled metal roll with the polyethylene film in direct contact therewith so that it can be solidified.

Although the extrusion coating process produces a satisfactory bond between the two films, it impairs the optical clarity of the laminate. Varying the temperature of the molten polyethylene, changing the nip pressure to improve the bonding and flow of the polyethylene film, or improving the surface characteristics of the metal roll which contacts the polyethylene film have not produced on optically clear laminate.

The haziness or lack of clarity of the laminate appears to result from imprints or impressions imparted to the moisture-proof coating on the regenerated cellulose film by its contact with the peripheral surface of the rubber roll. Such impressions or imprints are believed to be caused by heat dissipated by the molten polyethylene film at the nip which softens the moisture-proof coating and makes it liable to impressions from irregularities in the peripheral surface of the rubber roll. Attempts to make the rubber roll without these surface irregularities have not met with success. Additionally, the softness of the rubber roll renders its peripheral surface susceptible to damage during normal operating conditions which, of course, results in further surface irregularities.

Accordingly, it is an object of this invention to form a clear laminate of polyethylene film and regenerated cellulose film having a moisture-proof coating on its surface remote from the polyethylene film.

Another object of this invention is to prevent the peripheral surface of the rubber roll from making impressions or imprints in the moisture-proof coating of the regenerated cellulose film.

Other and additional objects will become apparent hereinafter.

According to the present invention, in extrusion coating of the moisture-proof coated regenerated cellulose film with a melt-extruded thermoplastic coating film, such as polyethylene film, optical clarity is obtained by passage of said films between the nip of a rotating pressure-applying rubber roll and a counter-rotating cooled metal roll, and wherein a liquid film is maintained on the pressure applying rubber surface which contacts the moisture-proof coated side of the regenerated cellulose film, said liquid being chemically inert with respect to the moisture-proof coating and the equipment used. The liquid film prevents direct contact between the rubber roll surface and the moisture-proof coating, and thus prevents the rubber roll from making impressions or imprints therein. It is also believed the liquid film keeps the moisture-proof coating below the temperature at which it becomes impressionable.

The term "moisture-proof" coating is used herein to define well known coatings which have helped make regenerated cellulose commercial by lowering its otherwise high moisture permeabiltiy. Generally, the moisture-proof coating primarily consists of nitro-cellulose and hydrocarbon wax.

The nature of the invention and the manner in which the invention may be practiced will become clear from the detailed description when taken in conjunction with the accompanying drawing forming a part of the specification and wherein:

The drawing is a perspective view schematically showing apparatus suitable for forming a clear laminate by the practice of this invention.

Referring now to the drawing, a slot-type extrusion die 10 is spaced above and in alignment with the nip 12 of a pair of counter-rotating rolls 14 and 16. The rolls 14 and 16 are suitably driven and are suitably mounted to apply a controllable pressure on the films passing through the nip 12 by means well known to those skilled in the art.

The roll 16 is rigid preferably being made of metal. The peripheral surface of the metal roll 16 is smooth to prevent the polyethylene film from adhering to it and to prevent marking of such film. Additionally, the roll 16 is cooled, such as by circulating cooled water therethrough, for solidifying the polyethylene film, as hereinafter more fully set forth.

The roll 14 has a thick resilient rubber or elastomeric peripheral coating. Illustrative of the types of rubber which can be used include natural, Hycar, butyl, silicone elastomer, and Buna N. In general, a roll made from any one of these materials has irregularities in its peripheral surface. Such surface irregularities are believed to result from the nature of the resilient material in that the desired smoothness cannot be obtained in the finished roll. Additionally, the softness of the resilient material renders its surface 18 susceptible to damage under normal operation which also produces the undesirable surface irregularities.

To form a clear laminate of a thermoplastic of polyethylene film and a moisture-proof coated regenerated cellulose film, a thin liquid film 20 is maintained on at least that portion of the peripheral surface 18 of the rubber pressure roll 14 which can deleteriously affect the clarity of the laminate. The liquid film directly contacts the moisture-proof coating of the regenerated cellulose film as it is fed over the rubber roll. In this manner, the peripheral surface 18 of the roll 14 is prevented from contacting the moisture-proof coating, and thus cannot transfer impressions thereto. It is also believed the liquid film 20 keeps the moisture-proof coating below the temperature at which it becomes impressionable. Consequently the moisture-proof coated regenerated cellulose film passes over the roll 14 and through the nip 12 with its clarity unimpaired.

In the embodiment shown in the drawing the liquid film 20 is obtained by placing a trough 25 having a liquid 23 therein beneath the rotating rubber roll 14 in such position that the peripheral surface 18 of the roll 14 passes through or contacts the liquid 23. A doctor roll 27 can be positioned adjacent the rubber pressure roll 14 to control the amount of liquid being carried up onto and around the peripheral surface 18 of the roll 14.

In forming a clear laminate 34 from a molten polyethylene film and a continuous length of regenerated cellulose film 22 having a moisture-proof coating 24 on one of its surfaces, the regenerated cellulose film 22 is fed from an external source over the rubber roll 14 to the nip 12 with the moisture-proof coating 24 in direct contact with the liquid film 20 for the entire arc it travels about the roll 14 including the nip 12 and thus its clarity is maintained.

Concurrently, polyethylene is melt-extruded downwardly from the die 10 in film form. At the nip 12 the polyethylene film 26 is applied to the uncoated surface 28 of the regenerated cellulose film 22. Here the bond or adhesion between the films 22 and 26 is produced. The resultant clear laminate 34 is then passed around an arc of the cooled metal roll 16 with the polyethylene film 26 in direct contact with the metal roll so that said film 26 can be solidified. Thereafter the clear laminate 34 is fed to a desired location, such as to a wind-up reel upon which it is wound, not shown.

It is to be understood any liquid which will not deleteriously affect the equipment or the moisture-proof coating 24 of the regenerated cellulose film 22 can be used for the liquid film 20. Water because of its availability and economical advantage is preferred in forming the laminate 34. Preferably the liquid film 20 is maintained at temperature sufficiently low to keep the moisture-proof coating 24 from softening and becoming impressionable. Maintaining the water 23 in the trough 25 at a temperature from about 75° F. to 125° F. has been found satisfactory. Also well known surface active agents can be added to the liquid medium to permit through and uniform wetting of the peripheral surface 18 of the roll 14.

The tension needed on the regenerated cellulose film 22 passing around the rubber pressure roll 14 to insure obtaining a liquid film 20 between such film 22 and roll 14 can be readily determined by those skilled in the art. In any event, the tension on the regenerated cellulose film 22 cannot be so great as to squeeze out the liquid film 20 because then the moisture-proof coating 24 will directly contact the roll 14 whereby the clarity of the resultant laminate will be impaired. The minimum thickness of such liquid film 20 must be sufficient to prevent the moisture-proof coating 24 from directly contacting the roll 14 or in other words just slightly thicker than the irregularities in the peripheral surface 18 of the roll 14.

Preferably, the polyethylene film 26 is made from film-forming ethylene polymers having a density of 0.93 gm./cm.$^3$ or less. The thickness of the polyethylene film 26 can be varied by correlating the thickness of the molten material being extruded through the die opening, the relative travel rate of the films 22 and 26 and the pressure obtained in the nip 12 of the counter-rotating rolls 14 and 16. Desirably, the polyethylene film 26 of the resultant laminate 34 is relatively thin having a thickness from about 0.2 mils to about 10 mils.

The regenerated cellulose film is self supporting with thicknesses of 1 mil and 2 mils having been found satisfactory. The moisture-proof coating 24 on the regenerated cellulose film 22 can be 0.1 mil or greater in thickness. A typical moisture-proof coating generally includes nitrocellulose, plasticizer, rosin and hydrocarbon wax. Such moisture-proof coatings are well known and for a more detailed discussion see volume 44 of Industrial and Engineering Chemistry 2514 through 2524, and the book entitled, "Cellulosics" which was published by Reinhold Publishing Corporation.

The details and manner of practicing this invention will become apparent by reference to the following specific example; it being understood that this example is merely an embodiment of the invention and that the scope of the invention is not limited thereto.

*Example*

A clear laminate of polyethylene film and a regenerated cellulose film having a moisture-proof coating on one of its surfaces was formed using apparatus as illustrated in the drawing. The polyethylene had a melt index of 30 and a density of 0.92 gm./cm.$^3$. The die 10 was at a temperature of about 600° F. and downwardly melt-extruded polyethylene in film form having a thickness of 20 mils at the die opening. The roll 16 was made of metal having a smooth peripheral surface and was maintained at a temperature of about 100° F. The roll 14 was made of rubber having a "Durometer" hardness of 95 and its peripheral surface 18 had irregularities therein. The thin liquid film 20 of water was maintained at a temperature of about 80° F. The regenerated cellulose film 22 having a moisture-proof coating 24 on one of its surfaces was fed from an external source over the water wetted rubber roll 14 to the nip 12, the moisture-proof coating 24 being in direct contact with the liquid 20 throughout the entire arc it traveled about the roll 14. At the nip 12 of the rolls 14 and 16 the molten polyethylene film was applied to the uncoated surface of the regenerated cellulose film 22 wherein the rolls 14 and 16 exerted a laminating pressure against the films 22 and 26 of about 20 pounds per lineal inch at the nip. The resultant laminate 34 was withdrawn from the nip 12 at the rate of 50 feet per minute and then run around an arc of the chilled metal roll 16 with the polyethylene film 26 in peripheral contact therewith for solidifying it. Thereafter the clarity of the laminate 34 was measured by test procedure ASTM D 1003-52. Such laminate 34 had a total haze value of 7.5.

For purposes of comparison, a laminate was also formed by the procedure set forth in the example except that the moisture-proof coating of the regenerated cellulose film was fed over the rubber roll 14 in direct contact with its peripheral surface 18. The clarity of the resultant laminate was measured by test procedure ASTM 1003-52. The total haze value of the laminate was 13.0.

Thus, the example dramatically illustrates the significant increase in the clarity of the laminate formed by the practice of this invention over the clarity of a laminate formed without the benefit of this invention.

A clear laminate of polyethylene film and regenerated cellulose film having a moisture-proof coating on its surface remote from the polyethylene film formed by the practice of this invention can be used extensively for food packaging. The polyethylene film and moisture-proof coating serve as excellent moisture-proof barriers while the regenerated cellulose film is highly resistant to the action of oily materials and is an excellent barrier to many gases. Also, due to the heat sealing properties of polyethylene, the laminate can be readily heat sealed to form heat seals characterized by their strength. Additionally, the clear laminate is transparent so that the packaged contents therein can be readily seen.

While it is preferred to form a clear laminate including a thermoplastic coating of either low density, medium density or high density polyethylene, other thermoplastic materials including polypropylene, polyisobutylene, polyvinylidene chloride, polyvinyl chloride, polyacrylic and methacrylic acids and esters, polyamides, polyurethanes, polyethylene terephthalate, etc., and copolymers, interpolymers and mixtures thereof can be used. The thermoplastic materials can also be compounded with stabilizers, antiblocking agents, slip agents, pigments and the like. Correspondingly, while it is preferred to form a clear laminate including a moisture-proof coated regenerated cellulose film other coated films and webs which will soften and become liable to impressions from the rubber rolls 14 as they are fed thereover can be used. Of course, uncoated films and webs which will soften and thereby become impressionable can also be employed.

Since it is obvious that various changes and modifications may be made in the described method and apparatus

What is claimed is:

1. In apparatus for forming a clear laminate of a polyethylene coating and regenerated cellulose film having a moisture-proof coating on one of its surfaces, means for downwardly melt-extruding the polyethylene coating in film form, a pair of counter-rotating rolls having a nip below and in alignment with said extruding means for bonding to the other surface of said regenerated cellulose film one surface of the molten polyethylene film, the film, the roll making direct contact with the other surface of the polyethylene film having a chilled, smooth, metallic, peripheral surface and the other of said rolls having a rubber peripheral surface over which the moisture-proof coated regenerated cellulose film is fed, and a trough containing a liquid beneath the rotating rubber roll with its peripheral surface at least contacting the liquid such that a liquid film is carried up onto and around the rubber roll between its peripheral surface and the moisture-proof coating of the regenerated cellulose film.

2. In the method of forming optically clear thermoplastic coated regenerated cellulose film by extruding molten thermoplastic onto one surface of a regenerated cellulose film having a wax containing, moisture-proof coating its other surface wherein said coated film is passed through the nip of a pressure applying roll having a resilient elastomeric surface, said elastomeric pressure applying roll having inherent irregularities and a cooled metal chill roll, thereby laminating the molten thermoplastic coating to the surface of the cellulose film, the improvement of maintaining a continuous film of water on the peripheral surface of the pressure applying, elastomeric surfaced roll, which contacts the wax containing moisture-roof coating on the cellulose film, said film of water having a thickness greater than the irregularities inherent in said elastomeric pressure applying roll, thereby preventing said pressure applying roll from transferring impressions to said moisture-proof coating.

3. In the method of forming optically clear thermoplastic coated regenerated cellulose film by extruding molten thermoplastic onto one surface of a regenerated cellulose film having a wax containing, moisture-proof coating on its other surface wherein said coated film is passed through the nip of a pressure applying roll having a resilient rubber surface, said pressure applying roll having inherent irregularities and a cooled metal chill roll, thereby laminating the molten thermoplastic coating to the surface of the cellulose film, the improvement of maintaining a continuous film of water on the peripheral surface of the pressure applying, rubber surfaced roll, which contacts the wax containing moisture-proof coating on the film, said water film having a thickness greater than the irregularities inherent in said rubber pressure applying roll, thereby preventing said pressure applying roll from transferring impressions to said moisture-proof coating.

4. The method of claim 3 wherein the thermoplastic coating is polyethylene.

References Cited by the Examiner

UNITED STATES PATENTS

| | | | |
|---|---|---|---|
| 1,590,638 | 6/26 | Marquette | 18—2 |
| 2,514,213 | 7/50 | Mason et al. | 18—10 |
| 2,683,894 | 7/54 | Kritchever | 18—1 |
| 2,709,146 | 5/55 | Berry et al. | |
| 2,944,586 | 7/60 | Yanulis | 154—1 |
| 2,956,671 | 10/60 | Cornwell | 206—46 |
| 3,017,302 | 1/62 | Hultkrans | 154—43 |
| 3,033,707 | 5/62 | Lacy et al. | 117—76 |

FOREIGN PATENTS 641,568   8/50   Great Britain.

EARL M. BERGERT, *Primary Examiner.*

JOSEPH REBOLD, CARL F. KRAFFT, *Examiners.*